(12) United States Patent
Furuta et al.

(10) Patent No.: US 11,659,506 B2
(45) Date of Patent: May 23, 2023

(54) COMMUNICATION DEVICE AND STORAGE MEDIUM

(71) Applicant: KABUSHIKI KAISHA TOKAI RIKA DENKI SEISAKUSHO, Aichi (JP)

(72) Inventors: Masateru Furuta, Aichi (JP); Tadashi Fukagai, Aichi (JP); Yuki Kono, Aichi (JP); Yutaka Kubo, Aichi (JP)

(73) Assignee: KABUSHIKI KAISHA TOKAI RIKA DENKI SEISAKUSHO, Aichi (JP)

( * ) Notice: Subject to any disclaimer, the term of this patent is extended or adjusted under 35 U.S.C. 154(b) by 184 days.

(21) Appl. No.: 17/159,315

(22) Filed: Jan. 27, 2021

(65) Prior Publication Data

US 2021/0297962 A1 Sep. 23, 2021

(30) Foreign Application Priority Data

Mar. 23, 2020 (JP) .............................. JP2020-051718

(51) Int. Cl.
*H04W 56/00* (2009.01)
*H04W 4/46* (2018.01)
*H04W 92/18* (2009.01)

(52) U.S. Cl.
CPC ........... *H04W 56/001* (2013.01); *H04W 4/46* (2018.02); *H04W 92/18* (2013.01)

(58) Field of Classification Search
None
See application file for complete search history.

(56) References Cited

U.S. PATENT DOCUMENTS

| 5,723,911 | A | * | 3/1998 | Glehr | ........................ | G07C 9/28 |
| | | | | | | 340/426.36 |
| 9,566,945 | B2 | | 2/2017 | Ghabra et al. | | |
| 2004/0203600 | A1 | * | 10/2004 | McCorkle | ............. | H04L 63/162 |
| | | | | | | 455/411 |
| 2005/0068225 | A1 | * | 3/2005 | Inoue | ........................ | G01S 3/50 |
| | | | | | | 455/39 |
| 2012/0243638 | A1 | * | 9/2012 | Maltsev | .............. | H04L 27/2656 |
| | | | | | | 375/316 |
| 2014/0148107 | A1 | * | 5/2014 | Maltsev | ................... | H04B 1/02 |
| | | | | | | 455/91 |

(Continued)

*Primary Examiner* — Nicholas Sloms
(74) *Attorney, Agent, or Firm* — Greenblum & Bernstein, P.L.C.

(57) ABSTRACT

To provide a mechanism capable of matching timings at which communication is performed between devices. A communication device for performing wireless communication with another communication device, the communication device comprising: a first wireless communication unit configured to perform communication conforming to a first wireless communication standard; a second wireless communication unit configured to perform communication conforming to a second wireless communication standard; and a control unit configured to control the first wireless communication unit so that the first wireless communication unit transmits, a plurality of times, a first signal, the first signal being a signal conforming to the first wireless communication standard and being a signal including setting information that is information for setting a timing at which the second wireless communication unit performs communication.

10 Claims, 3 Drawing Sheets

(56) References Cited

U.S. PATENT DOCUMENTS

| | | | | |
|---|---|---|---|---|
| 2014/0330449 | A1* | 11/2014 | Oman | B60R 25/01 |
| | | | | 701/2 |
| 2016/0332598 | A1* | 11/2016 | Ghabra | B60R 25/30 |
| 2018/0068509 | A1* | 3/2018 | Obergfell | B60R 25/24 |
| 2018/0106882 | A1* | 4/2018 | Kanaga | G01S 11/06 |
| 2018/0162321 | A1* | 6/2018 | Spiess | G07C 9/00309 |
| 2018/0335514 | A1* | 11/2018 | Dees | G01S 7/36 |
| 2019/0051072 | A1* | 2/2019 | Okada | H04B 1/7163 |
| 2021/0181294 | A1* | 6/2021 | Kusumoto | H04W 64/006 |

* cited by examiner

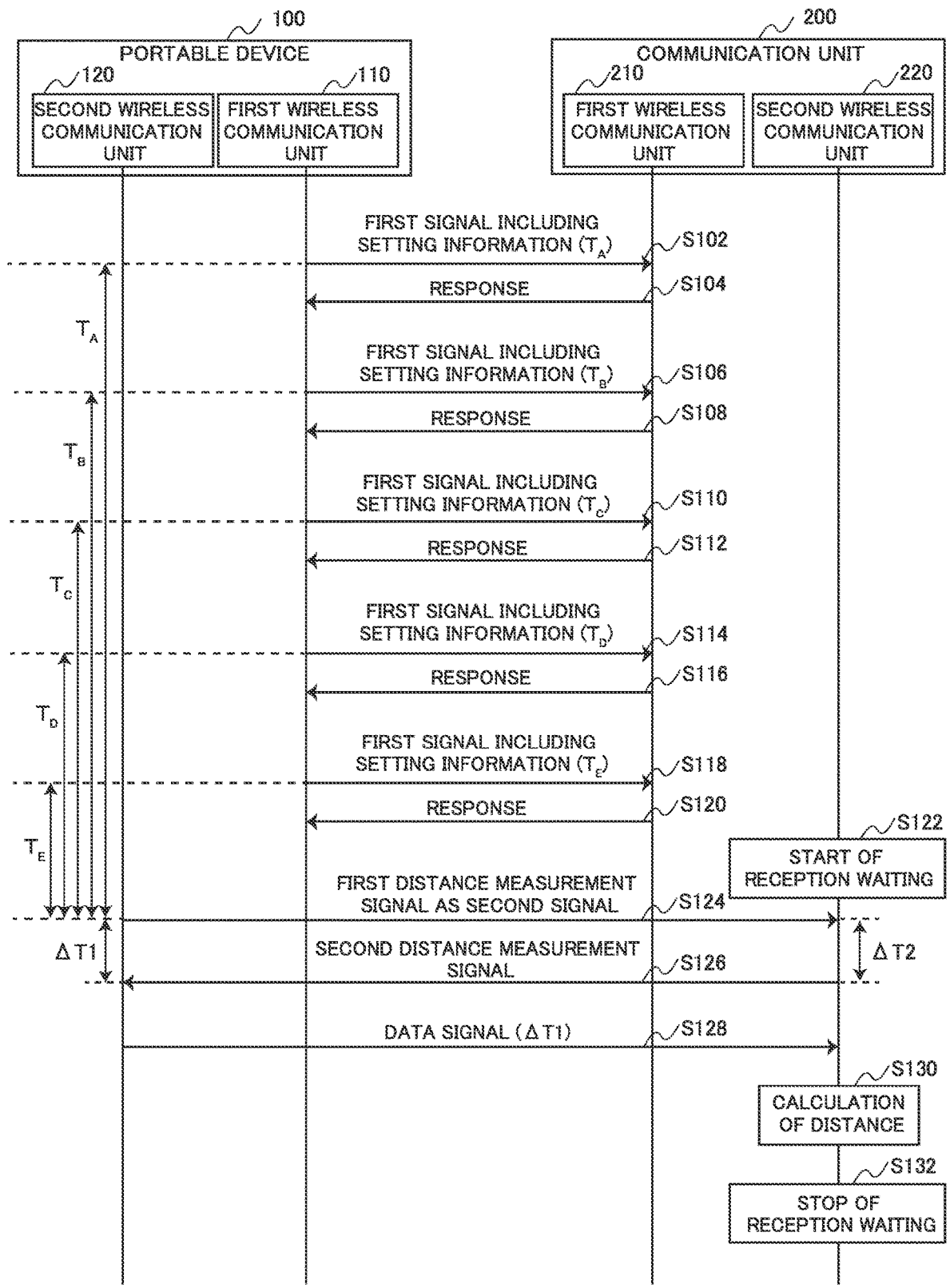

COMMUNICATION DEVICE AND STORAGE MEDIUM

CROSS REFERENCE TO RELATED APPLICATION(S)

This application is based upon and claims benefit of priority from Japanese Patent Application No. 2020-051718, filed on Mar. 23, 2020, the entire contents of which are incorporated herein by reference.

BACKGROUND

The present invention relates to a communication device and a storage medium.

In recent years, various techniques for measuring a distance between devices (hereinafter also referred to as distance measurement) have been developed. For example, U.S. Pat. No. 9,566,945 B2 discloses a technique for measuring a distance between devices on the basis of a time required from signal transmission to signal reception (hereinafter also referred to as a propagation time).

SUMMARY

However, in the technique described in U.S. Pat. No. 9,566,945 B2, a way of determining a timing at which signals are transmitted and received between devices is not studied.

Therefore, the present invention has been made in view of the above problem, and an object of the present invention is to provide a mechanism capable of matching timings at which communication is performed between devices.

To solve the above described problem, according to an aspect of the present invention, there is provided a communication device for performing wireless communication with another communication device, the communication device comprising: a first wireless communication unit configured to perform communication conforming to a first wireless communication standard; a second wireless communication unit configured to perform communication conforming to a second wireless communication standard; and a control unit configured to control the first wireless communication unit so that the first wireless communication unit transmits, a plurality of times, a first signal, the first signal being a signal conforming to the first wireless communication standard and being a signal including setting information that is information for setting a timing at which the second wireless communication unit performs communication.

To solve the above described problem, according to another aspect of the present invention, there is provided a communication device for performing wireless communication with another communication device, the communication device comprising: a first wireless communication unit configured to perform communication conforming to a first wireless communication standard; a second wireless communication unit configured to perform communication conforming to a second wireless communication standard; and a control unit configured to control the first wireless communication unit so that the first wireless communication unit transmits, a plurality of times, a first signal, the first signal being a signal conforming to the first wireless communication standard and being a signal including setting information that is information for setting a timing at which the second wireless communication unit performs communication.

To solve the above described problem, according to another aspect of the present invention, there is provided a communication device for performing wireless communication with another communication device, the communication device comprising: a first wireless communication unit configured to perform communication conforming to a first wireless communication standard; a second wireless communication unit configured to perform communication conforming to a second wireless communication standard; and a control unit configured to control the first wireless communication unit so that the first wireless communication unit transmits, a plurality of times, a first signal, the first signal being a signal conforming to the first wireless communication standard and being a signal including setting information that is information for setting a timing at which the second wireless communication unit performs communication.

As described above, according to the present invention, a mechanism capable of matching a timing at which communication is performed between devices is provided.

BRIEF DESCRIPTION OF THE DRAWINGS

FIG. 3 is a sequence diagram illustrating an example of a flow of a process that is executed by the system according to the present embodiment.

DETAILED DESCRIPTION OF THE INVENTION

Figure 1:
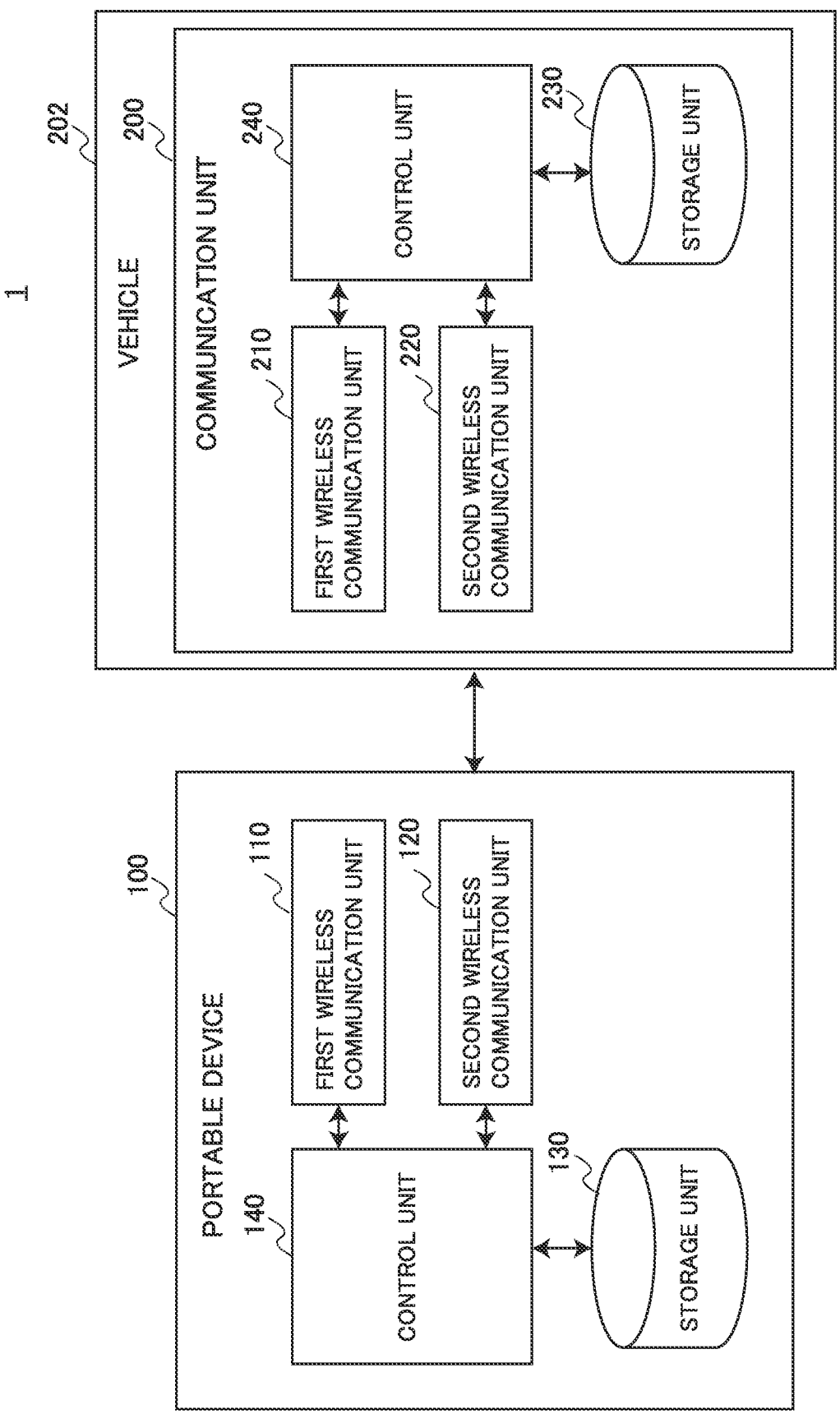
FIG. 1 is a diagram illustrating an example of a configuration of a system according to an embodiment of the present invention.

Hereinafter, referring to the appended drawings, preferred embodiments of the present invention will be described in detail. It should be noted that, in this specification and the appended drawings, structural elements that have substantially the same function and structure are denoted with the same reference numerals, and repeated explanation thereof is omitted.

1. Configuration Example

FIG. 1 is a diagram illustrating an example of a configuration of a system 1 according to an embodiment of the present invention. As illustrated in FIG. 1, the system 1 according to the present embodiment includes a portable device 100 and a communication unit 200. The communication unit 200 in the present embodiment is mounted in a vehicle 202. The vehicle 202 is an example of a usage target of a user.

A communication device on the authenticatee side (also referred to as a first communication device) and a communication device on the authenticator side (also referred to as a second communication device) are involved in the present embodiment. The portable device 100 is an example of the first communication device. The communication unit 200 is an example of the second communication device.

In the system 1, when the user (for example, a driver of the vehicle 202) carries the portable device 100 and approaches the vehicle 202, wireless communication for authentication is performed between the portable device 100 and the communication unit 200. When the authentication is successful, a door lock of the vehicle 202 is unlocked or an engine is started such that the vehicle 202 becomes available to the user. The system 1 is also referred to as a smart entry system. Hereinafter, respective components will be described in order.

(1) Portable Device 100

The portable device 100 is a communication device that performs wireless communication with the communication unit 200. The portable device 100 is configured as an arbitrary device that is carried and used by the user. Examples of the arbitrary device include an electronic key, a smartphone, and a wearable terminal. As illustrated in FIG. 1, the portable device 100 includes a first wireless communication unit 110, a second wireless communication unit 120, a storage unit 130, and a control unit 140.

The first wireless communication unit 110 has a function of performing communication conforming to a first wireless communication standard. For example, the first wireless communication unit 110 performs wireless communication with the communication unit 200. The second wireless communication unit 120 has a function of performing communication conforming to a second wireless communication standard. For example, the second wireless communication unit 120 performs wireless communication with the communication unit 200.

An example of the first wireless communication standard may include Bluetooth Low Energy (BLE (registered trademark)). BLE is known as a low power consumption wireless communication standard. In BLE, signals in a 2.4 GHz band are transmitted and received.

An example of the second wireless communication standard may include a standard in which signals using an ultra-wide band (UWB) are transmitted and received. In wireless communication of signals using UWB, when an impulse scheme is used, a propagation time of radio waves can be measured with high accuracy by using radio waves with a very short pulse width equal to or smaller than nanoseconds, and distance measurement based on a propagation time can be performed with high accuracy. UWB often refers to a frequency band of about 3 GHz to about 10 GHz.

Thus, the second wireless communication standard may be a wireless communication standard using carrier waves having a frequency higher than that of carrier waves in the first wireless communication standard. Hereinafter, it is assumed that the first wireless communication standard is BLE. That is, it is assumed that the first wireless communication unit 110 is configured as a communication interface capable of communication in BLE. Further, it is assumed that the second wireless communication standard is a wireless communication standard using UWB. That is, it is assumed that the second wireless communication unit 120 is configured as a communication interface capable of communication in UWB.

The storage unit 130 has a function of storing various types of information for an operation of the portable device 100. For example, the storage unit 130 stores a program for an operation of the portable device 100, an identifier (ID), a password, an authentication algorithm for authentication, and the like. The storage unit 130 is configured of, for example, a storage medium such as a flash memory, and a processing device that executes recording and reproduction on the storage medium.

The control unit 140 has a function of executing a process in the portable device 100. For example, the control unit 140 controls the first wireless communication unit 110 and the second wireless communication unit 120 to perform communication with the communication unit 200. Further, the control unit 140 performs reading of information from the storage unit 130 and writing of information to the storage unit 130. Further, the control unit 140 controls an authentication process that is performed with the communication unit 200. The control unit 140 is configured of, for example, an electronic circuit such as a central processing unit (CPU) and a microprocessor.

(2) Communication Unit 200

The communication unit 200 is a communication device that performs wireless communication with the portable device 100. The communication unit 200 is provided in association with the vehicle 202. Here, it is assumed that the communication unit 200 is mounted in the vehicle 202, such as the communication unit 200 being installed in a cabin of the vehicle 202 or being incorporated in the vehicle 202 as a communication module. As illustrated in FIG. 1, the communication unit 200 includes a first wireless communication unit 210, a second wireless communication unit 220, a storage unit 230, and a control unit 240.

The first wireless communication unit 210 has a function of performing communication conforming to the first wireless communication standard. For example, the first wireless communication unit 210 performs wireless communication with the portable device 100. Hereinafter, it is assumed that the first wireless communication unit 210 is configured as a communication interface capable of communication in BLE.

The second wireless communication unit 220 has a function of performing communication conforming to the second wireless communication standard. For example, the second wireless communication unit 220 performs wireless communication with the portable device 100. Hereinafter, it is assumed that the second wireless communication unit 220 is configured as a communication interface capable of communication in UWB.

The storage unit 230 has a function of storing various types of information for an operation of the communication unit 200. For example, the storage unit 230 stores a program for an operation of the communication unit 200, and an authentication algorithm. The storage unit 230 includes, for example, a storage medium such as a flash memory, and a processing device that executes recording and reproduction on the storage medium.

The control unit 240 has a function of controlling an overall operation of the communication unit 200 and an in-vehicle device mounted in the vehicle 202. As an example, the control unit 240 controls the first wireless communication unit 210 and the second wireless communication unit 220 to perform communication with the portable device 100. Further, the control unit 240 performs reading of information from the storage unit 230 and writing of information to the storage unit 230. Further, the control unit 240 functions as an authentication control unit that controls an authentication process that is performed with the portable device 100. Further, the control unit 240 functions as a door lock control unit that controls a door lock of the vehicle 202 and performs locking and unlocking of the door lock. Further, the control unit 240 functions as an engine control unit that controls an engine of the vehicle 202, and performs start and stop of the engine. A power source included in the vehicle 202 may be, for example, a motor in addition to the engine. The control unit 240 is configured as, for example, an electronic control unit (ECU).

2. Technical Characteristics

(1) Distance Measurement Process

The portable device 100 and the communication unit 200 perform a distance measurement process. The distance measurement process is a process of measuring a distance between the portable device 100 and the communication unit 200. The distance measured in the distance measurement process is also referred to as a distance measurement value below.

In the distance measurement process, signals can be transmitted and received wirelessly.

An example of a signal that is transmitted and received in the distance measurement process is a distance measurement signal. The distance measurement signal is a signal that is transmitted and received for measurement of a distance between devices. The distance measurement signal is also a signal that is a measurement target. For example, a time required for transmission and reception of the distance measurement signal is measured. Typically, the distance measurement signal is formed in a frame format having no payload portion in which data is stored. Of course, the distance measurement signal may be formed in a frame format having a payload portion in which data is stored.

In the distance measurement process, a plurality of distance measurement signals can be transmitted and received between devices. Among the plurality of distance measurement signals, a distance measurement signal that is transmitted from one device to another device is also referred to as a first distance measurement signal. A distance measurement signal that is transmitted from the device that has received the first distance measurement signal to the device that has transmitted the first distance measurement signal is also referred to as a second distance measurement signal.

Another example of the signal that is transmitted and received in distance measurement process is a data signal. The data signal is a signal that stores and conveys data. The data signal is formed in a frame format having a payload portion in which data is stored.

Transmission and reception of signals in the distance measurement process is also referred to as distance measurement communication below. In the present embodiment, it is assumed that the second wireless communication unit 120 and the second wireless communication unit 220 perform the distance measurement communication. In the distance measurement process, a distance between the second wireless communication unit 120 and the second wireless communication unit 220 that have performed the distance measurement communication is measured as a distance between the portable device 100 and the communication unit 200.

An example of the distance measurement process will be described with reference to FIG. 2.

Figure 2:
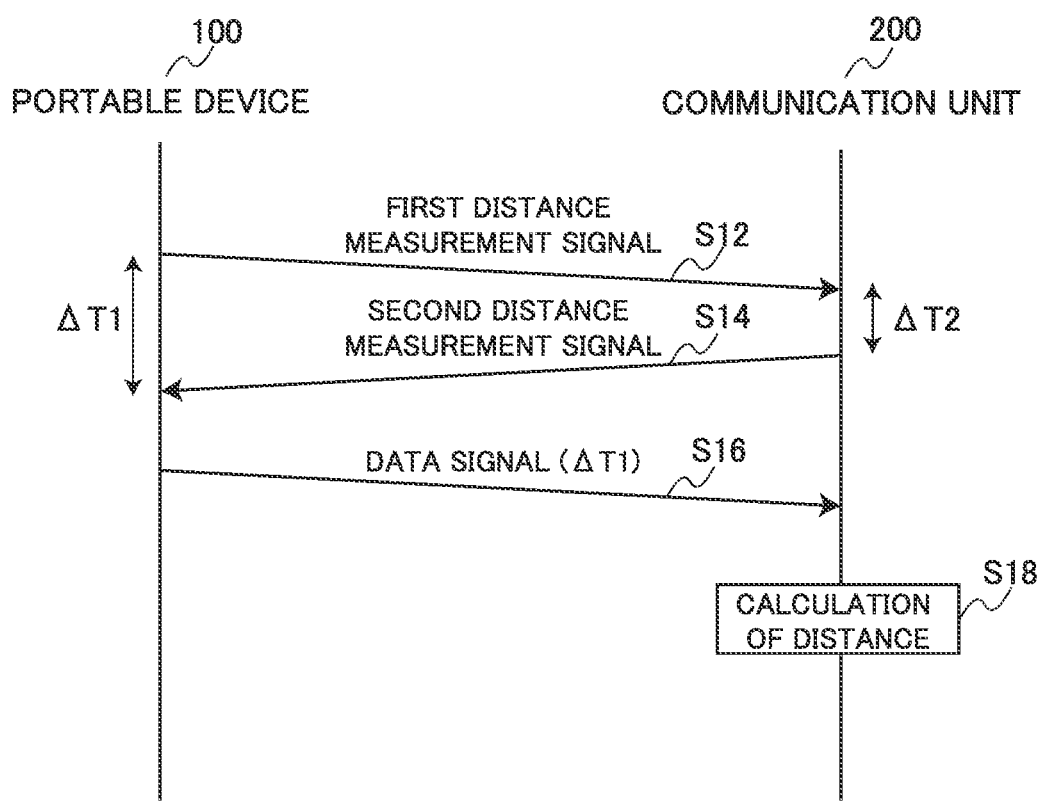
FIG. 2 is a sequence diagram illustrating an example of a flow of a distance measurement process that is executed by a system according to the present embodiment.

FIG. 2 is a sequence diagram illustrating an example of a flow of a distance measurement process that is executed by the system 1 according to the present embodiment. As illustrated in FIG. 2, the portable device 100 and the communication unit 200 are involved in this sequence.

As illustrated in FIG. 2, first, the second wireless communication unit 120 of the portable device 100 transmits the first distance measurement signal (step S12). For example, the first distance measurement signal may be transmitted as a signal using UWB.

Next, when the second wireless communication unit 220 of the communication unit 200 receives the first distance measurement signal from the portable device 100, the second wireless communication unit 220 transmits the second distance measurement signal as a response to the first distance measurement signal (step S14). For example, the second distance measurement signal may be transmitted as a signal using UWB.

In this case, the control unit 240 of the communication unit 200 measures a time $\Delta T2$ from a reception time of the first distance measurement signal to a transmission time of the second distance measurement signal in the communication unit 200. On the other hand, when the second distance measurement signal is received from the communication unit 200, the control unit 140 of the portable device 100 measures a time $\Delta T1$ from a transmission time of the first distance measurement signal to a reception time of the second distance measurement signal in the portable device 100.

Next, the second wireless communication unit 120 of the portable device 100 transmits a data signal including information indicating the time $\Delta T1$ (step S16). For example, the data signal may be transmitted as a signal using UWB.

When the data signal is received, the control unit 240 of the communication unit 200 calculate a distance between the portable device 100 and the communication unit 200 on the basis of $\Delta T1$ indicated by the information included in the data signal and the measured time $\Delta T2$ (step S18). Specifically, the control unit 240 divides a result of $\Delta T1 - \Delta T2$ by 2 to calculate a propagation time of a one-way signal. The control unit 240 multiplies such a propagation time by a speed of the signal to calculate the distance (that is, a distance measurement value) between the portable device 100 and the communication unit 200.

The distance measurement value can be used for authentication of the portable device 100. For example, the control unit 240 determines authentication success when the distance measurement value is smaller than a predetermined threshold value. On the other hand, the control unit 240 determines authentication failure when the distance measurement value is equal to or greater than the predetermined threshold value.

(2) Control of Communication Timing

Operation of Portable Device 100

The control unit 140 controls the first wireless communication unit 110 so that the first wireless communication unit 110 transmits, a plurality of times, a first signal that is a signal conforming to the first wireless communication standard, which is a signal including setting information that is information for setting a timing at which the second wireless communication unit 120 performs communication. For example, the portable device 100 transmits a BLE signal including setting information for setting a timing at which communication using UWB is performed, a plurality of times. By transmitting the setting information, it is possible to match a timing at which communication conforming to the second wireless communication standard is performed between the portable device 100 and the communication unit 200 that has received the setting information. Further, by transmitting the first signal a plurality of times, it is possible to improve a probability that the communication unit 200 will succeed in receiving the first signal.

The control unit 140 controls the second wireless communication unit 120 so that the second wireless communication unit 120 performs communication at a timing set in the setting information. For example, the portable device 100 performs communication using UWB with the communication unit 200 at a timing set in the setting information transmitted in a state in which the setting information is included in the BLE signal. With such a configuration, it becomes possible to perform the communication conforming to the second wireless communication standard with the communication unit 200 at an appropriate timing. An example of the communication conforming to the second wireless communication standard is the distance measurement communication.

The control unit 140 may control the second wireless communication unit 120 so that the second wireless communication unit 120 performs communication at the timing set in the setting information, that is, may control the second wireless communication unit 120 so that the second wireless communication unit 120 transmits a second signal that is a signal conforming to the second wireless communication standard at the timing set in the setting information. For example, the portable device 100 transmits the signal using UWB at a timing set in the setting information transmitted in a state in which the setting information is included in the BLE signal. With such a configuration, it is possible to transmit the second signal at a timing at which the communication unit 200 that has received the setting information can receive the second signal. When the communication conforming to the second wireless communication standard is the distance measurement communication, an example of the second signal is a distance measurement signal.

Operation of Communication Unit 200

When the first signal is received by the first wireless communication unit 210, the control unit 240 controls the second wireless communication unit 220 so that the second wireless communication unit 220 performs communication at the timing set in the setting information. For example, when the communication unit 200 receives the BLE signal including the setting information for setting a timing at which communication using UWB is performed, the communication unit 200 performs communication using UWB with the portable device 100 at the timing set in the setting information. With such a configuration, it is possible to perform communication conforming to the second wireless communication standard with the portable device 100 at an appropriate timing.

Here, the communication unit 200 can receive the first signal a plurality of times. When a plurality of first signals are received, the control unit 240 controls the second wireless communication unit 220 so that the second wireless communication unit 220 performs communication at the timing set in the setting information included in at least one of the plurality of first signals.

The control unit 240 may control the second wireless communication unit 220 so that the second wireless communication unit 220 performs communication at the timing set in the setting information, that is, may cause the second wireless communication unit 220 to start a process of receiving the second signal from a timing according to the timing set in the setting information. For example, the communication unit 200 starts a process of receiving a signal using UWB from a timing according to the timing set in the setting information included in the received BLE signal. In other words, the control unit 240 does not cause the process of receiving the second signal to be started until the timing according to the timing set in the setting information. With such a configuration, it is possible to shorten a period in which the process of receiving the second signal is executed in the communication unit 200.

An example of the timing according to the timing set in the setting information is the same timing as the timing set in the setting information. With such a configuration, the communication unit 200 starts the process of receiving the second signal at a timing at which the second signal is received. Therefore, it is possible to minimize the period in which the process of receiving the second signal is executed in the communication unit 200.

Another example of the timing according to the timing set in the setting information is a timing a predetermined time before the timing set in the setting information. With such a configuration, the communication unit 200 starts the process of receiving the second signal a predetermined time before the timing at which the second signal is received. With such a configuration, the communication unit 200 can start the process of receiving the second signal with a margin at least before the second signal arrives. Therefore, even when a timing at which the first signal arrives is delayed due to an influence of interference or the like or a process of acquiring the setting information from the received first signal takes time, the communication unit 200 can reliably receive the second signal.

An example of the process of receiving the second signal is reception waiting.

Reception waiting is a state in which a desired signal can be acquired and processed. The state in which the signal can be acquired and processed may be start of an input of a signal received via an antenna to a processing device. Further, the state in which the signal can be acquired and processed may be starting execution of various subsequent processes for the signal input to the processing device. The state in which the signal can be acquired and processed may mean receiving the desired signal via the antenna when input of a signal to the processing device is executed when it is detected that the desired signal has been received via the antenna.

Examples of various subsequent processes include a process of determining whether or not a signal received via the antenna is the desired signal, a process of confirming information included in the signal, and the like.

A state in which reception waiting is performed is also called a reception waiting state. A period in the reception waiting state is also referred to as a reception waiting period.

According to the embodiment, since the period in which the communication unit 200 is in the reception waiting state in order to receive the second signal is shortened, it is possible to reduce power consumption in the communication unit 200.

Setting Information

Each of the first signals transmitted a plurality of times may include, as the setting information, a time length from a time when the first signal is transmitted to a time when the communication conforming to the second wireless communication standard is performed. In other words, the setting information may include a time length from a time when the portable device 100 transmits the first signal including the setting information to a time when the communication conforming to the second wireless communication standard is performed. With such a configuration, the communication unit 200 can know the timing at which communication conforming to the second wireless communication standard is performed on the basis of a time when the first signal is received and the time length included in the setting information.

Alternatively, each of the first signals transmitted a plurality of times may include information corresponding to the time length from the time when the first signal is transmitted to the time when the communication conforming to the second wireless communication standard is performed, as the setting information. In other words, the setting information may include information corresponding to the time length from the time when the portable device 100 transmits the first signal including the setting information to the time when the communication conforming to the second wireless communication standard is performed. With such a configuration, the communication unit 200 can know a timing at which the communication conforming to the second wireless communication standard is performed on the basis of the time when the first signal is received and the time length corresponding to the information included in the setting information.

A correspondence relationship between the time length and the information corresponding to the time length is shared between the portable device 100 and the communication unit 200. An example of such a correspondence relationship is shown in Table 1 below.

TABLE 1

Example of correspondence relationship between time length and information corresponding to time length

| Time length (seconds) | Information corresponding to time length |
|---|---|
| $T_E$ | E |
| $T_D$ | D |
| $T_C$ | C |
| $T_B$ | B |
| $T_A$ | A |

In Table 1 above, the examples of the information corresponding to the time length include letters, but other information such as numbers may be used.

As described above, the portable device 100 can transmit the second signal at the timing set in the setting information. In that case, each of the first signals transmitted a plurality of times may include, as the setting information, a time length from the time when the first signal is transmitted to the time when the second signal is transmitted. In other words, the setting information may include a time length from the time when the portable device 100 transmits the first signal including the setting information to the time when the second signal is transmitted. With such a configuration, the communication unit 200 can know a timing at which the portable device 100 transmits the second signal on the basis of the time when the first signal is received and the time length included in the setting information.

Alternatively, each of the first signals transmitted a plurality of times may include information corresponding to the time length from the time when the first signal is transmitted to the time when the second signal is transmitted, as the setting information. In other words, the setting information may include information corresponding to the time length from the time when the portable device 100 transmits the first signal including the setting information to the time when the second signal is transmitted. With such a configuration, the communication unit 200 can know the timing at which the portable device 100 transmits the second signal on the basis of the time when the first signal is received and the time length corresponding to the information included in the setting information.

An example of the information included in the setting information has been described above. In any example, the communication unit 200 can know a timing at which the portable device 100 transmits the second signal. Therefore, the communication unit 200 can start the process of receiving the second signal at a timing at which the portable device 100 transmits the second signal.

In BLE, after a connection is established, signals are repeatedly transmitted and received in a predetermined period until the connection ends so that the connection is maintained. The transmission and reception of the signals that are performed in such a predetermined period is also referred to as periodic communication below. In BLE, the periodic communication is performed while hopping 37 channels. Therefore, in BLE, it is possible to maintain a connection even when one periodic communication fails. Hopping means changing a channel. Further, failure of the periodic communication means that a receiving side fails to receive a signal.

In the periodic communication, an empty packet is transmitted and received when there is no information to be transmitted or received. The empty packet is a packet in which no data is stored in a payload portion in which data is stored.

When the first wireless communication standard is BLE, the first signal including the setting information may be transmitted in the periodic communication. That is, in the embodiment, in the periodic communication, the first signal including the setting information may be transmitted and received instead of the empty packet.

(3) Flow of Process

FIG. 3 is a sequence diagram illustrating an example of a flow of a process that is executed by the system 1 according to the present embodiment. As illustrated in FIG. 3, the portable device 100 and the communication unit 200 are involved in this sequence.

As illustrated in FIG. 3, first, the control unit 140 of the portable device 100 controls the first wireless communication unit 110 so that the first wireless communication unit 110 transmits the first signal including setting information indicating that the second signal is transmitted after TA seconds (step S102). The first signal may be transmitted as a BLE signal.

When the first signal is received by the first wireless communication unit 210, the control unit 240 of the communication unit 200 controls the first wireless communication unit 210 so that the first wireless communication unit 210 transmits a response to the first signal (step S104). The response to the first signal may be a signal including information indicating that reception of the first signal has been successful. The control unit 240 can acquire the setting information included in the first signal received in step S102 to recognize that the second signal will be transmitted from the portable device 100 after the TA seconds. A response corresponding to the first signal may be transmitted as a BLE signal.

Then, the control unit 140 of the portable device 100 controls the first wireless communication unit 110 so that the first wireless communication unit 110 transmits the first signal including setting information indicating that the second signal is transmitted after TB seconds (step S106). The first signal may be transmitted as a BLE signal.

When the first signal is received by the first wireless communication unit 210, the control unit 240 of the communication unit 200 controls the first wireless communication unit 210 so that the first wireless communication unit 210 transmits a response to the first signal (step S108). The control unit 240 can acquire the setting information included in the first signal received in step S106 to recognize that the second signal will be transmitted from the portable device 100 after the TB seconds. A response corresponding to the first signal may be transmitted as a BLE signal.

Then, the control unit 140 of the portable device 100 controls the first wireless communication unit 110 so that the first wireless communication unit 110 transmits the first signal including the setting information indicating that the second signal is transmitted after $T_C$ seconds (step S110). The first signal may be transmitted as a BLE signal.

When the first signal is received by the first wireless communication unit 210, the control unit 240 of the communication unit 200 controls the first wireless communication unit 210 so that the first wireless communication unit 210 transmits a response to the first signal (step S112). The control unit 240 can acquire the setting information included in the first signal received in step S110 to recognize that the second signal will be transmitted from the portable device 100 after the $T_C$ seconds. A response corresponding to the first signal may be transmitted as a BLE signal.

Then, the control unit 140 of the portable device 100 controls the first wireless communication unit 110 so that the first wireless communication unit 110 transmits the first signal including setting information indicating that the second signal is transmitted after TD seconds (step S114). The first signal may be transmitted as a BLE signal.

When the first signal is received by the first wireless communication unit 210, the control unit 240 of the communication unit 200 controls the first wireless communication unit 210 so that the first wireless communication unit 210 transmits a response to the first signal (step S116). The control unit 240 can acquire the setting information included in the first signal received in step S114 to recognize that the second signal will be transmitted from the portable device 100 after the TD seconds. A response corresponding to the first signal may be transmitted as a BLE signal.

Then, the control unit 140 of the portable device 100 controls the first wireless communication unit 110 so that the first wireless communication unit 110 transmits the first signal including setting information indicating that the second signal is transmitted after $T_E$ seconds (step S118). The first signal may be transmitted as a BLE signal.

When the first signal is received by the first wireless communication unit 210, the control unit 240 of the communication unit 200 controls the first wireless communication unit 210 so that the first wireless communication unit 210 transmits a response to the first signal (step S120). The control unit 240 can acquire the setting information included in the first signal received in step S118 to recognize that the second signal will be transmitted from the portable device 100 after the $T_E$ seconds. A response corresponding to the first signal may be transmitted as a BLE signal.

The control unit 240 of the communication unit 200 controls the second wireless communication unit 220 so that the second wireless communication unit 220 starts reception waiting from the timing according to a timing set in the setting information included in the first signal transmitted a plurality of times (step S122). For example, the communication unit 200 starts reception waiting of the signal using UWB.

As an example, a timing at which the communication unit 200 starts reception waiting is after the TA seconds from the timing at which the first signal is received in step S102. As another example, the timing at which the communication unit 200 starts reception waiting is after the TB seconds from the timing at which the first signal is received in step S106. As another example, the timing at which the communication unit 200 starts reception waiting is after the $T_C$ seconds from the timing at which the first signal is received in step S110. As another example, the timing at which the communication unit 200 starts reception waiting is after the TD seconds from the timing at which the first signal is received in step S114. As another example, the timing at which the communication unit 200 starts reception waiting is after the $T_E$ seconds from the timing at which the first signal is received in step S118.

On the other hand, the control unit 140 of the portable device 100 controls the second wireless communication unit 120 so that the second wireless communication unit 120 transmits the first distance measurement signal serving as the second signal at the timing set in the setting information included in the first signal transmitted a plurality of times (step S124). For example, the first distance measurement signal may be transmitted as a signal using UWB.

As an example, a timing at which the portable device 100 transmits the first distance measurement signal serving as the second signal is after the TA seconds from a timing at which the first signal is transmitted in step S102. As another example, the timing at which the portable device 100 transmits the first distance measurement signal serving as the second signal is after the TB seconds from the timing at which the first signal is transmitted in step S106. As another example, the timing at which the portable device 100 transmits the first distance measurement signal serving as the second signal is after the $T_C$ seconds from the timing at which the first signal is transmitted in step S110. As another example, the timing at which the portable device 100 transmits the first distance measurement signal serving as the second signal is after the TD seconds from the timing at which the first signal is transmitted in step S114. As another example, the timing at which the portable device 100 transmits the first distance measurement signal serving as the second signal is after the $T_E$ seconds from the timing at which the first signal is transmitted in step S118.

Then, when the second wireless communication unit 120 of the portable device 100 receives the first distance measurement signal from the communication unit 200, the second distance measurement signal is transmitted as a response to the first distance measurement signal (step S126). For example, the second distance measurement signal may be transmitted as a signal using UWB.

In this case, the control unit 240 of the communication unit 200 measures a time ΔT2 from a reception time of the first distance measurement signal to a transmission time of the second distance measurement signal in the communication unit 200. On the other hand, when the control unit 140 of the portable device 100 receives the second distance measurement signal from the communication unit 200, the control unit 140 measures the time ΔT1 from the transmission time of the first distance measurement signal to the reception time of the second distance measurement signal in the portable device 100.

Then, the second wireless communication unit 220 of the portable device 100 transmits a data signal including the information indicating the time ΔT1 (step S128). For example, the data signal may be transmitted as a signal using UWB.

When the data signal is received, the control unit 240 of the communication unit 200 calculate a distance between the portable device 100 and the communication unit 200 on the basis of ΔT1 indicated by the information included in the data signal and the measured time ΔT2 (step S130). Specifically, the control unit 240 divides a result of ΔT1−ΔT2 by 2 to calculate a propagation time of a one-way signal. The control unit 240 multiplies such a propagation time by a speed of the signal to calculate the distance (that is, a distance measurement value) between the portable device 100 and the communication unit 200.

Thereafter, the control unit 240 of the communication unit 200 controls the second wireless communication unit 220 so that the second wireless communication unit 220 stops reception waiting (step S132). As an example, the control unit 240 may stop reception waiting a predetermined time after the start of reception waiting. As another example, the control unit 240 may stop reception waiting when the data signal is received in step S130. As another example, the control unit 240 may stop reception waiting when the distance measurement value is calculated. In any case, it is possible to reduce power consumption by stopping reception waiting.

Processes in steps S102 to S132 may be repeatedly executed.

Further, an example in which all signals that are transmitted and received in steps S102, S106, S110, S114, and S118 are the first signals including the setting information has been shown, but the present invention is not limited to such an example. At least some of the signals that are transmitted and received in steps S102, S106, S110, S114, and S118 may not include the setting information. For example, at least some of the signals that are transmitted and received in steps S102, S106, S110, S114, and S118 may be empty packets in BLE.

3. Supplement

Heretofore, preferred embodiments of the present invention have been described in detail with reference to the appended drawings, but the present invention is not limited thereto. It should be understood by those skilled in the art that various changes and alterations may be made without departing from the spirit and scope of the appended claims.

For example, in the above embodiment, an example in which the device that transmits the first signal including the setting information and the device that transmits the second signal are the same has been described, but the present invention is not limited to such an example. For example, the device that transmits the first signal including the setting information and the device that transmits the second signal may differ. Specifically, when the portable device 100 transmits the first signal including the setting information a plurality of times, the communication unit 200 may transmit the second signal at the timing set in the setting information included in the first signal. In this case, each of the first signals transmitted a plurality of times includes a time length from the time when the portable device 100 transmits the first signal to a time when the communication unit 200 transmits the second signal, or information corresponding to the time length. On the other hand, the portable device 100 starts the process of receiving the second signal from the timing according to the timing set in the setting information.

For example, the example in which the communication device that transmits the setting information is the portable device 100, and the communication device that receives the setting information is the communication unit 200 has been described above, but the present invention is not limited to such an example. For example, the communication device that transmits the setting information may be the communication unit 200, and the communication device that receives the setting information may be the portable device 100. That is, one of the communication device that transmits the setting information and the communication device that receives the setting information may be the communication unit 200. The other of the communication device that transmits the setting information and the communication device that receives the setting information may be the portable device 100.

For example, in the above embodiment, an example in which the data signal includes the information indicating the time $\Delta T1$ from the transmission time of the first distance measurement signal to the reception time of the second distance measurement signal in the portable device 100 has been described, but the present invention is not limited to such an example. The data signal may include information on the transmission time of the first distance measurement signal and the reception time of the second distance measurement signal. Hereinafter, another example of the information included in the data signal will be described.

Another example of the information included in the data signal is the information indicating the transmission time of the first distance measurement signal and the reception time of the second distance measurement signal in the portable device 100. That is, the portable device 100 may transmit time stamps of a start and an end of $\Delta T1$ without calculating $\Delta T1$.

Another example of the information included in the data signal is information indicating a distance between the portable device 100 and the communication unit 200 calculated on the basis of the time from the transmission time of the first distance measurement signal to the reception time of the second distance measurement signal. That is, the portable device 100 may calculate the distance between the portable device 100 and the communication unit 200 and transmit information indicating the calculated distance to the communication unit 200. For example, when $\Delta T2$ is a fixed value, the portable device 100 can calculate the distance measurement value by measuring $\Delta T1$.

Another example of the information included in the data signal is information indicating a result of authentication between the portable device 100 and the communication unit 200 on the basis of the distance between the portable device 100 and the communication unit 200. As an example, authentication can be performed on the basis of whether or not the distance between the portable device 100 and the communication unit 200 is equal to or smaller than a predetermined threshold value.

For example, in the above embodiment, an example in which the portable device 100 transmits the first distance measurement signal has been described, but the present invention is not limited to such an example. For example, the communication unit 200 may transmit the first distance measurement signal. In this case, when the portable device 100 receives the first distance measurement signal, the portable device 100 transmits the second distance measurement signal as a response thereto. The portable device 100 transmits the data signal including information indicating the time $\Delta T2$ from the reception time of the first distance measurement signal to the transmission time of the second distance measurement signal. On the other hand, the communication unit 200 calculates the distance measurement value on the basis of the time $\Delta T1$ from the transmission time of the first distance measurement signal to the reception time of the second distance measurement signal and the time $\Delta T2$ included in the data signal.

For example, in the above embodiment, an example in which the distance measurement value is calculated on the basis of the propagation time has been described, but the present invention is not limited to such an example. For example, the distance measurement value may be calculated on the basis of a radio wave intensity.

For example, in the above embodiment, an example in which the communication conforming to the second wireless communication standard is the distance measurement communication has been described, but the present invention is not limited to such an example. The communication conforming to the second wireless communication standard may be performed for any purpose.

For example, in the above embodiment, an example in which the first wireless communication standard is BLE and the second wireless communication standard is UWB has been described, but the present invention is not limited to such an example. As an example, in the first wireless communication standard, a signal in an ultra-high frequency (UHF) band and a signal in a low frequency (LF) band may be used. For example, the signal in the UHF band may be used for transmission from the portable device 100 to the communication unit 200, and the signal in the LF band may be used for transmission from the communication unit 200 to the portable device 100. As another example, Wi-Fi (registered trademark), infrared rays, Near Field Communication (NFC), or the like may be used as the first wireless communication standard or the second wireless communication standard.

For example, in the above embodiment, an example in which the communication unit 200 is a communication device mounted in a vehicle has been described, but the present invention is not limited to such an example. The communication unit 200 may be mounted on an arbitrary moving body other than a vehicle such as an aircraft or a ship. Here, the moving body is a moving device.

For example, in the above embodiment, an example in which the present invention is applied to a smart entry system has been described, but the present invention is not limited to such an example. The present invention can be applied to any system that performs communication conforming to a plurality of wireless communication standards. For example, the present invention can be applied to a pair including any two devices among a portable device, a vehicle, a smartphone, a drone, a house, a home electric appliance, and the like. The pair may include two devices of the same type or two devices of different types.

A series of processes of each device described in the present specification may be realized by using software, hardware, or a combination of software and hardware. Programs constituting the software are stored in advance in, for example, a recording medium (a non-transitory medium) provided inside or outside each device. Each program is read into a RAM at the time of execution by a computer and executed by a processor such as a CPU, for example. The recording medium is, for example, a magnetic disk, an optical disc, a magneto-optical disc, or a flash memory. Further, the above computer program may be distributed via a network, for example, without using the recording medium.

Further, the processes described in the present specification using the flowchart and the sequence diagram do not necessarily have to be executed in the shown order. Some processing steps may be performed in parallel. Further, additional processing steps may be adopted, and some processing steps may be omitted.

EXPLANATION OF REFERENCES

1: System
100: Portable device
110: First wireless communication unit
120: Second wireless communication unit
130: Storage unit
140: Control unit
200: Communication unit
202: Vehicle
210: First wireless communication unit
220: Second wireless communication unit
230: Storage unit
240: Control unit

What is claimed is:

1. A communication device for performing wireless communication with another communication device, the communication device comprising:
    a first wireless communication unit configured to perform communication conforming to a first wireless communication standard;
    a second wireless communication unit configured to perform communication conforming to a second wireless communication standard; and
    a control unit configured to control the first wireless communication unit so that the first wireless communication unit transmits, a plurality of times, a first signal, the first signal being a signal conforming to the first wireless communication standard and being a signal including setting information that is information for setting a timing at which the second wireless communication unit performs communication, wherein
    the control unit controls the second wireless communication unit so that the second wireless communication unit performs communication at the timing set in the setting information,
    each of the first signals transmitted a plurality of times includes, as the setting information, information indicating a time length from a time when the first signal is transmitted to a time when the communication conforming to the second wireless communication standard is performed,
    the first signal transmitted later among the first signals transmitted a plurality of times includes setting information indicating a shorter time length.

2. The communication device according to claim 1, wherein each of the first signals transmitted a plurality of times includes, as the setting information, a time length from a time when the first signal is transmitted to a time when the communication conforming to the second wireless communication standard is performed.

3. The communication device according to claim 1, wherein each of the first signals transmitted a plurality of times includes, as the setting information, information corresponding to a time length from a time when the first signal is transmitted to a time when the communication conforming to the second wireless communication standard is performed.

4. The communication device according to claim 1, wherein the control unit controls the second wireless communication unit so that the second wireless communication unit performs communication at the timing set in the setting information, the control unit controlling the second wireless communication unit so that the second wireless communication unit transmits a second signal that is a signal conforming to the second wireless communication standard at the timing set in the setting information.

5. The communication device according to claim 4, wherein each of the first signals transmitted a plurality of times includes, as the setting information, a time length from a time when the first signal is transmitted to a time when the second signal is transmitted.

6. The communication device according to claim 4, wherein each of the first signals transmitted a plurality of times includes, as the setting information, information corresponding to a time length from a time when the first signal is transmitted to a time when the second signal is transmitted.

7. The communication device according to claim 1,
wherein one of the communication device and the other communication device is mounted in a vehicle, and
the other of the communication device and the other communication device is a device carried by a user of the vehicle.

8. A communication device for performing wireless communication with another communication device, the communication device comprising:
a first wireless communication unit configured to perform communication conforming to a first wireless communication standard;
a second wireless communication unit configured to perform communication conforming to a second wireless communication standard; and
a control unit configured to control the second wireless communication unit so that the second wireless communication unit performs communication at a timing set in setting information when a first signal, the first signal being a signal conforming to the first wireless communication standard and being a signal including setting information for setting a timing at which the second wireless communication unit performs communication, is received by the first wireless communication unit, wherein
the control unit is configured to control the second wireless communication unit so that the second wireless communication unit performs communication at the timing set in the setting information,
each of the first signals transmitted a plurality of times includes, as the setting information, information indicating a time length from a time when the first signal is transmitted to a time when the communication conforming to the second wireless communication standard is performed, and
the first signal transmitted later among the first signals transmitted a plurality of times includes setting information indicating a shorter time length.

9. The communication device according to claim 8, wherein the control unit causes the second wireless communication unit to start a process for receiving a second signal, the second signal being a signal conforming to the second wireless communication standard, from a timing according to the timing set in the setting information.

10. A non-transitory storage medium storing a program for causing a computer for controlling a communication device including a first wireless communication unit configured to perform communication conforming to a first wireless communication standard with another communication device, and a second wireless communication unit configured to perform communication conforming to a second wireless communication standard with the other communication device to function as
a control unit configured to control the second wireless communication unit so that the second wireless communication unit performs communication at a timing set in setting information when a first signal, the first signal being a signal conforming to the first wireless communication standard and being a signal including setting information for setting a timing at which the second wireless communication unit performs communication, is received by the first wireless communication unit, wherein
the control unit is configured to control the second wireless communication unit so that the second wireless communication unit performs communication at the timing set in the setting information,
each of the first signals transmitted a plurality of times includes, as the setting information, information indicating a time length from a time when the first signal is transmitted to a time when the communication conforming to the second wireless communication standard is performed, and
the first signal transmitted later among the first signals transmitted a plurality of times includes setting information indicating a shorter time length.

* * * * *